United States Patent
Nemiroff et al.

(10) Patent No.: US 9,319,224 B2
(45) Date of Patent: Apr. 19, 2016

(54) PUBLIC KEY INFRASTRUCTURE FOR SYSTEM-ON-CHIP

(71) Applicant: INTEL CORPORATION, Santa Clara, CA (US)

(72) Inventors: Daniel Nemiroff, Folsom, CA (US); William Stevens, Jr., Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 7 days.

(21) Appl. No.: 14/039,667

(22) Filed: Sep. 27, 2013

(65) Prior Publication Data

US 2015/0095650 A1   Apr. 2, 2015

(51) Int. Cl.
*H04L 29/06* (2006.01)
*H04L 9/32* (2006.01)
*G09C 1/00* (2006.01)

(52) U.S. Cl.
CPC ............... *H04L 9/3263* (2013.01); *G09C 1/00* (2013.01)

(58) Field of Classification Search
USPC ........................................................ 713/175
See application file for complete search history.

(56) References Cited

U.S. PATENT DOCUMENTS

| | | | |
|---|---|---|---|
| 7,707,405 B1* | 4/2010 | Gilman et al. | 713/156 |
| 2002/0026578 A1* | 2/2002 | Hamann et al. | 713/159 |
| 2002/0108042 A1* | 8/2002 | Oka et al. | 713/175 |
| 2007/0220279 A1* | 9/2007 | Northcutt et al. | 713/193 |
| 2011/0154011 A1* | 6/2011 | Efraim et al. | 713/100 |
| 2012/0036372 A1* | 2/2012 | Leclercq | 713/192 |
| 2014/0164779 A1* | 6/2014 | Hartley et al. | 713/176 |
| 2014/0205092 A1* | 7/2014 | Hartley et al. | 380/44 |
| 2014/0331064 A1* | 11/2014 | Ballesteros | 713/193 |

OTHER PUBLICATIONS

A Public-Key Infrastructure for Key Distribution|https://dash.harvard.edu/bitstream/handle/1/2829933/Malan_PublicKey.pdf?sequence=4|Malan et al.|2004|Pages 1-11|.*

* cited by examiner

*Primary Examiner* — Mahfuzur Rahman
(74) *Attorney, Agent, or Firm* — International IP Law Group, P.L.L.C.

(57) ABSTRACT

The present disclosure is generally related to embedding public key infrastructure information to a system-on-chip (SOC). The method includes generating a key pair including a public key and a private key. The method includes creating a digital certificate corresponding to the public key. The method includes signing the digital certificate with a unique signature. The method includes extracting the public key and the unique signature into a key file, wherein the key file is to be stored in a plurality of silicon fuses on the SOC.

27 Claims, 5 Drawing Sheets

100

200

400

PUBLIC KEY INFRASTRUCTURE FOR SYSTEM-ON-CHIP

TECHNICAL FIELD

The present disclosure is generally related to public key infrastructure (PKI). More specifically, the present disclosure is generally related to provisioning PKI to a semi-conductor device.

BACKGROUND

In a public key infrastructure (PKI), a public key is bound to an individual or entity by means of a digital certificate. A certificate authority can attach a signature to the digital certificate to verify that the public key is provisioned to the individual. Provisioning a public key and a digital certificate to a piece of software can be often performed using a secure Internet connection.

BRIEF DESCRIPTION OF THE FIGURES

The following detailed description may be better understood by referencing the accompanying drawings, which contain specific examples of numerous objects and features of the disclosed subject matter.

DETAILED DESCRIPTION

The present disclosure is generally related to embedding public key infrastructure to a system-on-chip (SOC). In public key infrastructure, a public key and a private key are mathematically linked. A public key can be used by a user or entity to encrypt information, while a private key can be used by a certificate authority to decrypt the encrypted information. When provisioning public key infrastructure to hardware, integrated flash memory may be used to store the public key and the entirety of the digital certificate. If a hardware module such as an SOC does not contain integrated flash memory, the hardware module may store information in a plurality of silicon fuses or transistors. However, a digital certificate may be large and contain as many as 10,000 bits of information, which may require several thousand silicon fuses.

Embodiments disclosed herein describe a system and method for embedding public key infrastructure to an SOC by compressing the amount of information to be stored in the plurality of silicon fuses. According to embodiments described herein, non-deterministic information, such as a public key and a signature, can be extracted from the digital certificate. The non-deterministic information can be written into a key file. The key file can be stored in the silicon fuses on an SOC. The signature can be small enough in size to be stored in the SOC using only a few hundred fuses, as opposed to the several thousand used to store the entirety of the digital certificate. In some embodiments, the SOC can be integrated to a motherboard of an electronic device. In some embodiments, the electronic device contains logic for reading the key file, and generating a digital certificate from the public key and the signature.

Figure 1:
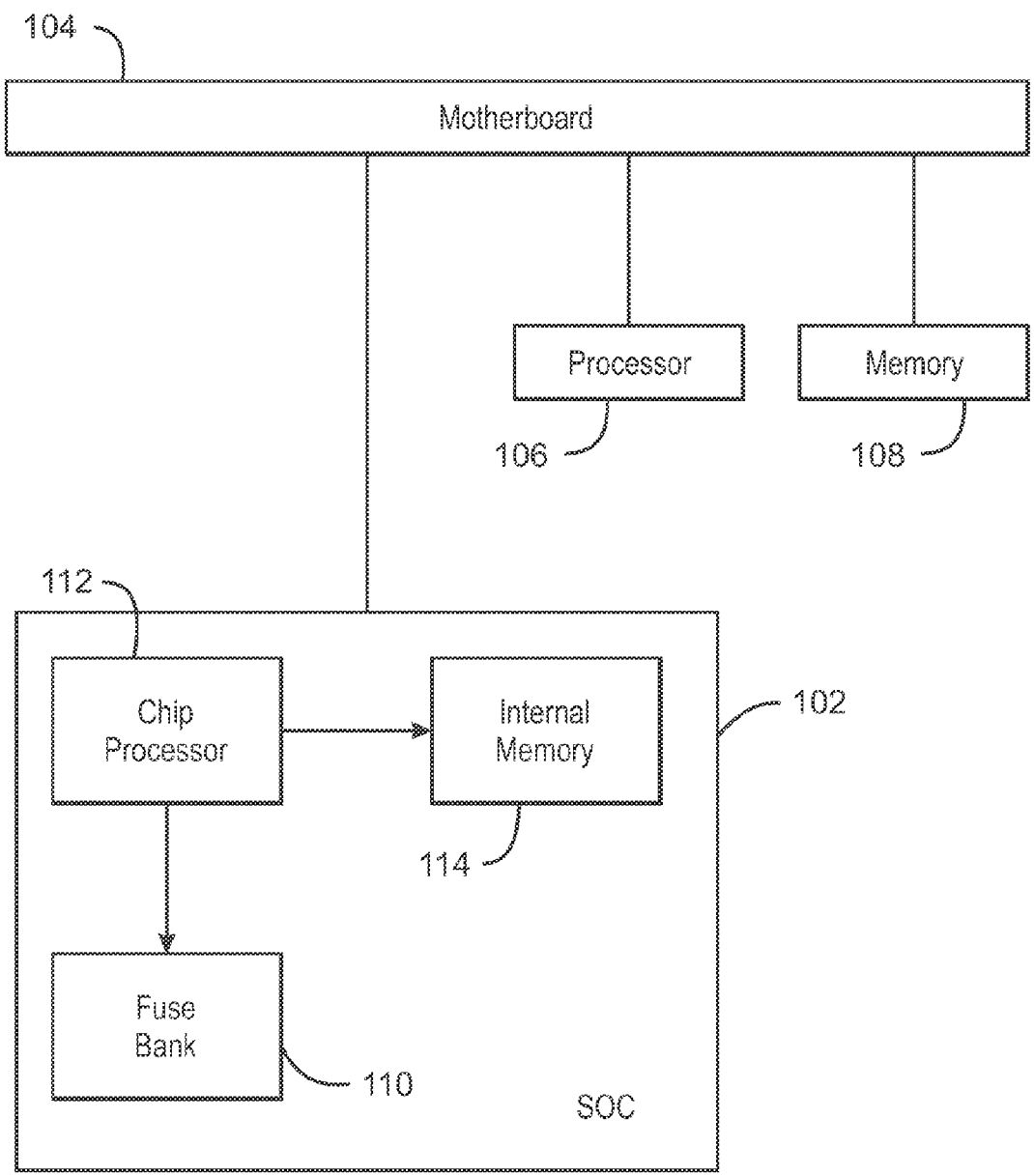
FIG. 1 is a system block diagram of an electronic device, in accordance with embodiments.

FIG. 1 is a system block diagram of an electronic device, in accordance with embodiments. The electronic device 100 may be an electronic device, such as a desktop computer, a mobile computer, or a server. The electronic device 100 can include a system-on-chip (SOC) 102 coupled to a motherboard 104. The electronic device 100 may also include at least one processor 106 and a memory unit 108. The memory unit 108 may use flash memory, read-only memory, or any other type of non-volatile memory.

The SOC 102 can include a fuse bank 110 coupled to a chip processor 112. In some embodiments, the SOC 102 also includes an internal memory 114 coupled to the chip processor 112. In some embodiments, the internal memory 206 is not accessible by the rest of the electronic device 100.

The fuse bank 110 can include a plurality of silicon fuses, each of which are capable of storing information. The number of silicon fuses in the fuse bank 110 can be large enough to store a key file containing a public key and a signature from a digital certificate.

The SOC 102 can be used to support the electronic device 100 with membership in a public key infrastructure (PKI). The SOC 102 may be configured to store non-deterministic information corresponding to a digital certificate, such as a public key and a signature. In some embodiments, the processor 106 includes firmware for regenerating the digital certificate from the public key, and appending the signature to the regenerated digital certificate. In some embodiments, the memory unit 108 includes software for regenerating the digital certificate from the public key, and appending the signature to the regenerated digital certificate.

The public key and the regenerated digital certificate can be stored in the memory unit 108. The signed digital certificate identifies the electronic device 100 as a trusted entity to encrypt information using the public key. Information encrypted by the public key may be decrypted by another entity using a private key corresponding to the public key.

Figure 2:
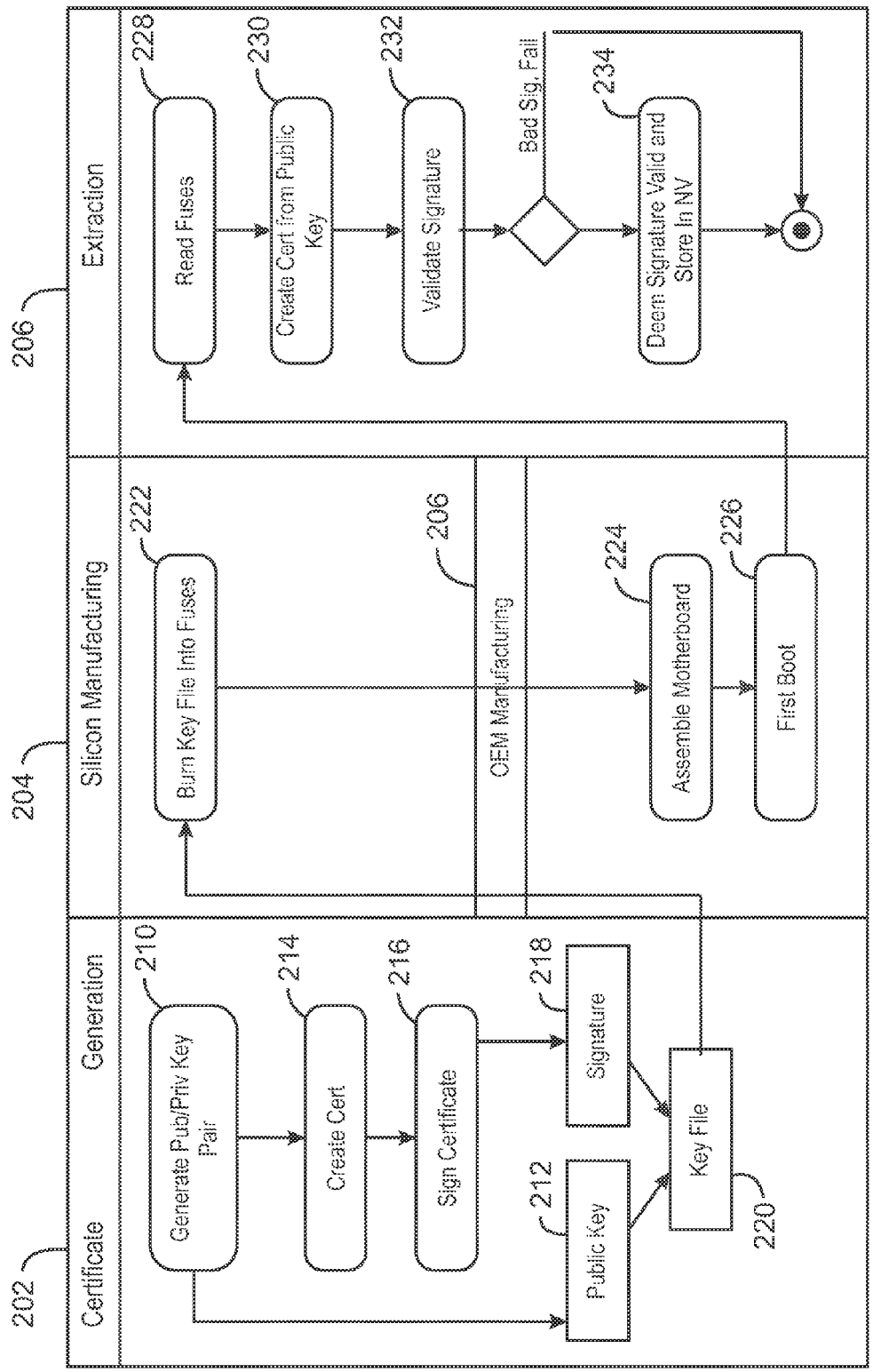
FIG. 2 is a diagram illustrating various processes and components for embedding public key infrastructure to hardware.

FIG. 2 is a diagram illustrating various processes and components for embedding public key infrastructure to hardware. The processes illustrated by the diagram 200 may include a certificate generation process 202, a silicon manufacturing process 204, an original equipment manufacturing (OEM) process 206, and an extraction process 208.

During the certificate generation process 202, a digital certificate is compressed to be stored in a key file. At block 210, a certificate authority can generate a key pair that includes a private key and a public key 212. The private key and the public key 212 can be mathematically linked such that information that is encrypted using the public key 212 can be decrypted using the private key. At block 212, the certificate authority can create a digital certificate. The digital certificate can grant a user or entity rights to use the public key 212. At block 214, the certificate authority can sign the digital certificate with a signature 218. The certificate authority can store the signature 218 and the public key 212 in a key file 220. The key file 220 can later be stored on a chipset such that the stored information can be accessed by a processor. In some embodiments, the certificate authority can also generate a template that can be used to regenerate the digital certificate from the public key 212. In some embodiments, the template may be an algorithm that accepts the public key 212 or signature 218 as inputs, and outputs the fully formed digital certificate. In some embodiments, the template may be a data structure with placeholders for the public key 212 or signature 218.

During the silicon manufacturing process 204, a chipset containing a processor and a plurality of silicon fuses can be manufactured. The chipset may be a system-on-chip 102 as described in FIG. 1. At block 222, the key file 220 containing the public key and the signature can stored by burning the key file 220 into the plurality of fuses.

During the OEM manufacturing process 206, the chipset can be integrated into a computer containing a processor and non-volatile memory. At block 224, the chipset can be assembled onto a motherboard. At block 226, firmware or software containing instructions for regenerating the digital certificate can be loaded into the computer as the computer is first booted. In some embodiments, the non-volatile memory can store the template used to regenerate the digital certificate, or a root certificate that can be used to validate the signature 218. The root certificate can be an unsigned certificate that identifies a certificate authority and is common to digital certificates created by the certificate authority. The root certificate may be global to all compressed certificates such that the root certificate can be downloaded from a server, or stored on a hard disk drive, a solid state drive, or other non-volatile storage. The root certificate may contain its own public key to verify the signature 218 of the compressed digital certificate.

During the extraction process 208, the digital certificate can be decompressed to identify the computer as a trusted entity to use the public key 212. At block 228, after the chipset has been integrated with the computer, the fuses can be read by the computer. The public key 212 and the signature 218 can be extracted. At block 230, the digital certificate can be regenerated from the public key. 230 In some embodiments, the digital certificate is regenerated by inputting the public key information into the template stored within the computer. At block 232, the signature is validated using a root certificate stored within the computer. At block 234, if the signature 218 is authentic, the signature 218 can be deemed valid as being part of the digital certificate. The digital certificate and the public key 212 can be stored in non-volatile memory.

Figure 3:
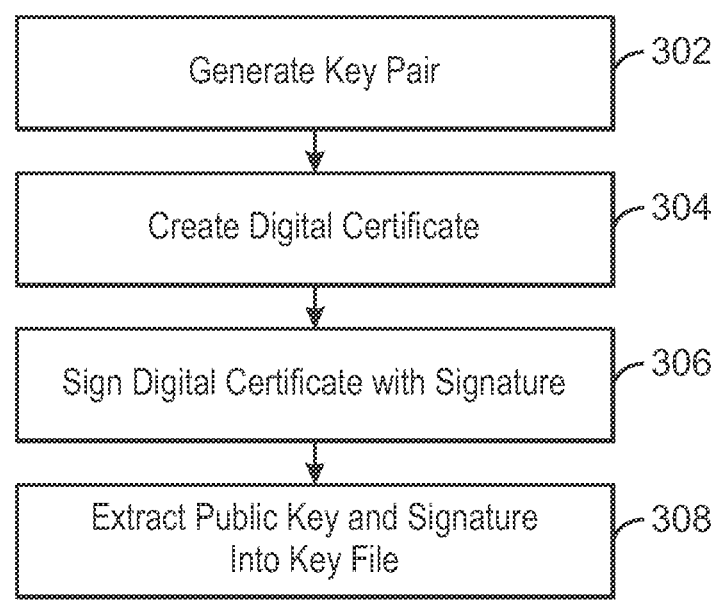
FIG. 3 is a process flow chart of a method to embed public key infrastructure (PKI) information to a system-on-chip (SOC).

FIG. 3 is a process flow chart of a method to embed public key infrastructure (PKI) to a system-on-chip (SOC). The method 300 can be performed by a processor of a computer or server that is designated as a certificate authority.

At block 302, a key pair containing a public key and a private key is generated. The key pair may be generated using a Rivest-Shamir-Adleman (RSA) algorithm, an Elliptic Curve Digital Signature Algorithm (ECDSA), or any other public-private cryptographic protocol. The private key can be used by the certificate authority to publish and bind the key to a particular user or entity.

At block 304, a digital certificate corresponding to the public key is created. The digital certificate may be an x.509 certificate, or may be a proprietary-binary certificate. The digital certificate is used to bind the public key to the user or entity. In some embodiments, a template for the digital certificate is also created. The template can be used to regenerate deterministic portions of the digital certificate. Deterministic portions of the digital certificate may include version, subject, and issuer information. In some embodiments, a root certificate is created. The root certificate can be used to validate a signature of the digital certificate.

At block 306, the digital certificate is signed by the certificate authority with a unique signature. The unique signature may be a non-deterministic portion of the digital certificate. The unique signature can verify that the digital certificate binds the public key to the user or entity.

At block 308, the public key and the signature are extracted from digital certificate and placed into a key file. The key file may be stored in a fuse bank of the SOC during silicon manufacturing. The SOC can be integrated to a motherboard.

Figure 4:
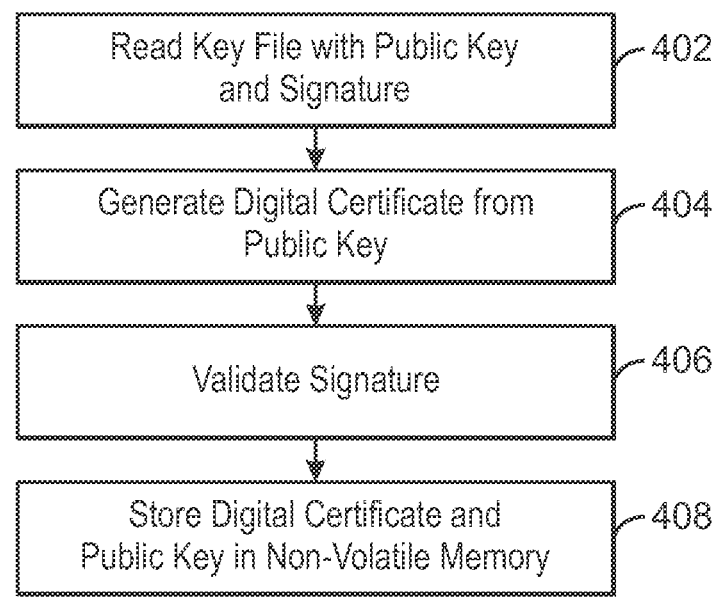
FIG. 4 is a process flow chart of a method to extract public key infrastructure (PKI) information from a system-on-chip (SOC).

FIG. 4 is a process flow chart of a method to read public key infrastructure (PKI) information from a system-on-chip (SOC). The method 400 can be performed by a electronic device containing firmware or software to extract the PKI information from the SOC.

At block 402, a key file containing a public key and a signature is read. The key file may be stored by a plurality of silicon fuses on the SOC. The signature may correspond to a digital certificate that binds the public key to a user or entity.

At block 404, a digital certificate is generated using the public key. The digital certificate may be generated using a template stored on the electronic device. Information regarding the public key can be inserted into the template, and deterministic portions of the digital certificate can be generated. Deterministic portions of the digital certificate may include version, subject, and issuer information.

At block 406, the signature is validated and appended to the digital certificate. The signature may be validated using a root certificate stored on the electronic device. If the signature is determined to be valid, the signature can be appended to the digital certificate.

At block 408, the digital certificate and the public key are stored in non-volatile memory of the electronic device. The signed digital certificate may bind the public key to the electronic device.

Figure 5:
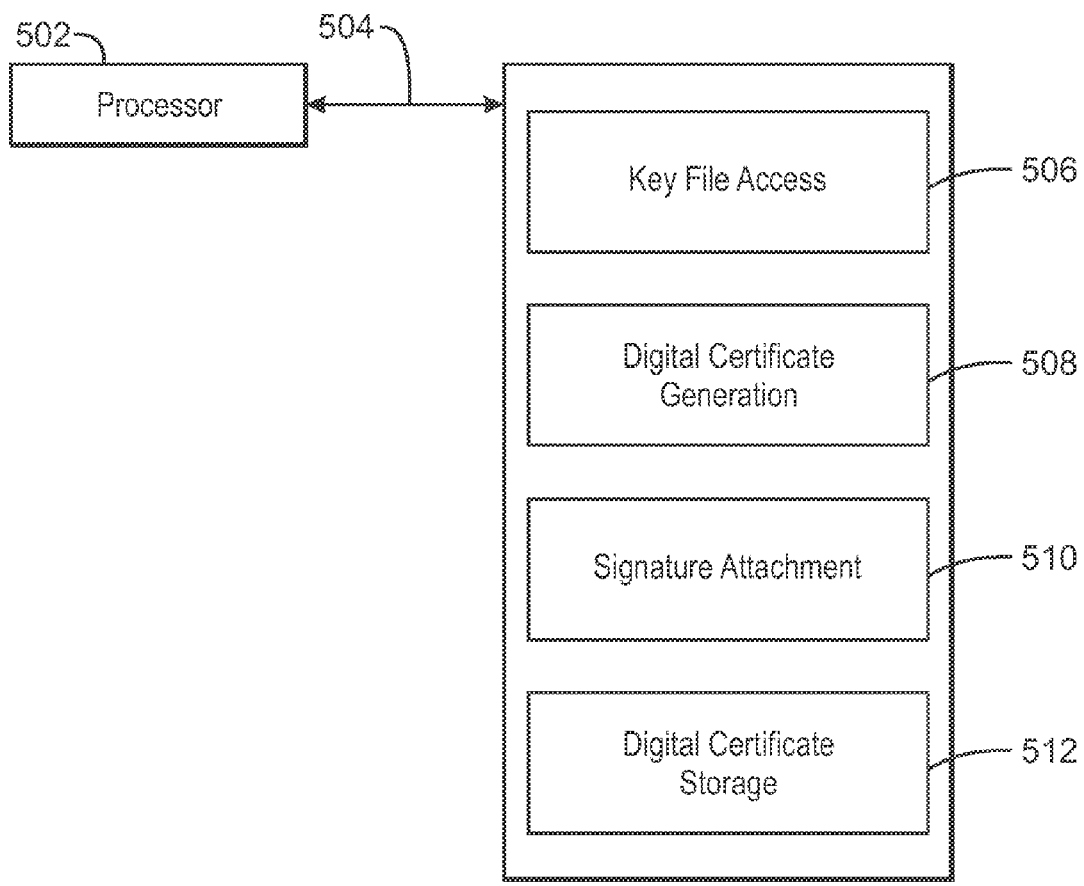
FIG. 5 is a block diagram showing tangible, non-transitory computer-readable medium containing instructions for extracting public key infrastructure (PKI) information from a system-on-chip.

FIG. 5 is a block diagram showing tangible, non-transitory computer-readable medium containing instructions for extracting public key infrastructure (PKI) information from a system-on-chip. The non-transitory, computer-readable medium 500 can include RAM, a hard disk drive, an array of hard disk drives, an optical drive, an array of optical drives, a non-volatile memory, a universal serial bus (USB) drive, a digital versatile disk (DVD), or a compact disk (CD), among others. The tangible, non-transitory computer-readable media 600 may be accessed by a processor 502 over a computer bus 604. Furthermore, the tangible, non-transitory computer-readable media 500 may include instructions configured to direct the processor 502 to perform the techniques described herein.

As shown in FIG. 5, the various components discussed herein can be stored on the non-transitory, computer-readable medium 500. A key file access module 506 may be configured to read a key file containing a public key and a signature. A digital certificate generation module 508 may be configured to generate a digital certificate using the public key. A signature attachment module 510 may be configured to validate and append the signature to the digital certificate. A digital certificate storage module 512 may be configured to store the digital certificate and the public key in non-volatile memory.

The block diagram of FIG. 5 is not intended to indicate that the tangible, non-transitory computer-readable media 500 are to include all of the components shown in FIG. 5. Further, the tangible, non-transitory computer-readable media 500 may include any number of additional components not shown in FIG. 5, depending on the details of the specific implementation.

EXAMPLE 1

A method for embedding public key infrastructure information to a system-on-chip (SOC) is described herein. The method includes generating a key pair that includes a public key and a private key. The method includes creating a digital certificate corresponding to the public key. The method includes signing the digital certificate with a unique signature. The method includes extracting the unique signature from the digital certificate, and saving the unique signature and the public key in a key file, the key file to be stored in a plurality of silicon fuses on the SOC.

EXAMPLE 2

A system-on-chip (SOC) for storing public key infrastructure information is described herein. The SOC includes a plurality of silicon fuses to store a key file, The key file includes a public key and a unique signature extracted from a digital certificate, wherein the public key and the unique signature are to be used to generate the digital certificate.

EXAMPLE 3

A method for extracting public key infrastructure information from a system-on-chip (SOC) is described herein. The method includes reading a key file stored in a plurality of silicon fuses, wherein the key file includes a public key and a unique signature extracted from a digital certificate. The method includes generating the digital certificate from the public key. The method includes validating the unique signature as part of the digital certificate. The method includes storing the digital certificate in non-volatile memory.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Some embodiments may be implemented in one or a combination of hardware, firmware, and software. Further, some embodiments may also be implemented as instructions stored on a machine-readable medium, which may be read and executed by a computing platform to perform the operations described herein. A machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices; or electrical, optical, acoustical or other form of propagated signals, e.g., carrier waves, infrared signals, digital signals, or the interfaces that transmit and/or receive signals, among others.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

Although some embodiments have been described in reference to particular implementations, other implementations are possible according to some embodiments. Additionally, the arrangement and order of circuit elements or other features illustrated in the drawings or described herein need not be arranged in the particular way illustrated and described. Many other arrangements are possible according to some embodiments.

In each system shown in a figure, the elements in some cases may each have a same reference number or a different reference number to suggest that the elements represented could be different or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

Although flow diagrams and state diagrams may have been used herein to describe embodiments, the inventions are not limited to those diagrams or to corresponding descriptions herein. For example, flow need not move through each illustrated box or state or in exactly the same order as illustrated and described herein.

The inventions are not restricted to the particular details listed herein. Indeed, those skilled in the art having the benefit of this disclosure will appreciate that many other variations from the foregoing description and drawings may be made within the scope of the present inventions. Accordingly, it is the following claims including any amendments thereto that define the scope of the inventions.

What is claimed is:

1. A method for embedding public key infrastructure information to a system-on-chip (SOC), comprising:
    generating a key pair comprising a public key and a private key;
    creating a digital certificate corresponding to the public key;
    signing the digital certificate with a unique signature; and
    extracting the unique signature from the digital certificate, and saving the unique signature and the public key in a key file, the key file to be stored in a plurality of silicon fuses on the SOC; and
    generating a template comprising deterministic portions of the digital certificate, the template to be used to regenerate the digital certificate from the public key;
    wherein the digital certificate is to be regenerated from the key file stored in the plurality of silicon fuses using the template.

2. The method of claim 1, comprising generating a root certificate to be used to validate the signature.

3. The method of claim 1, wherein the digital certificate is an x.509 certificate.

4. The method of claim 1, comprising generating the key pair using a Rivest-Shamir-Adleman (RSA) algorithm.

5. The method of claim 1, comprising generating the key pair using an Elliptic Curve Digital Signature Algorithm (ECDSA).

6. A system-on-chip (SOC) for storing public key infrastructure information, comprising a plurality of silicon fuses to store a key file, the key file comprising a public key and a unique signature extracted from a digital certificate, the public key and the unique signature to be used to regenerate the digital certificate using a template that contains deterministic portions of the digital certificate.

7. The SOC of claim 6, coupled to a processor comprising firmware to generate the digital certificate.

8. The SOC of claim 6, coupled to a non-volatile memory to store the generated digital certificate and the public key.

9. The SOC of claim 8, the non-volatile memory comprising software to generate the digital certificate.

10. The SOC of claim 8, the non-volatile memory to store the template used to generate the digital certificate from the public key.

11. The SOC of claim 6, wherein the public key is a Rivest-Shamir-Adleman (RSA) key.

12. The SOC of claim 6, wherein the public key is an Elliptic Curve Digital Signature Algorithm (ECDSA) key.

13. The SOC of claim 6, wherein the digital certificate is an x.509 certificate.

14. A method for extracting public key infrastructure information from a system-on-chip (SOC), comprising:
   reading a key file stored in a plurality of silicon fuses, the key file comprising a public key and a unique signature extracted from a digital certificate;
   regenerating the digital certificate from the public key using a template that contains deterministic portions of the digital certificate;
   validating the unique signature as part of the digital certificate;
   validating the unique signature using a root certificate; and
   storing the digital certificate in non-volatile memory.

15. The method of claim 14, comprising using a template to generate the digital certificate from the public key.

16. The method of claim 14, wherein the digital certificate is an x.509 certificate.

17. The method of claim 14, wherein the public key is a Rivest-Shamir-Adleman (RSA) key.

18. The method of claim 14, wherein the public key is an Elliptic Curve Digital Signature Algorithm (ECDSA) key.

19. A non-transitory computer-readable medium comprising instructions that direct a processor to embed public key infrastructure information to a system-on-chip (SOC), wherein the instructions, when executed, direct the processor to:
   generate a key pair comprising a public key and a private key;
   create a digital certificate corresponding to the public key;
   sign the digital certificate with a unique signature; and
   extract the unique signature from the digital certificate, and save the unique signature and the public key in a key file, the key file to be stored in a plurality of silicon fuses on the SOC; and
   generate a template comprising deterministic portions of the digital certificate, the template to be used to regenerate the digital certificate from the public key;
   wherein the digital certificate is to be regenerated from the key file stored in the plurality of silicon fuses using the template.

20. The non-transitory computer-readable medium of claim 19, wherein the instructions direct the processor to generate a root certificate to be used to validate the signature.

21. The non-transitory computer-readable medium of claim 19, wherein the digital certificate is an x.509 certificate.

22. The non-transitory computer-readable medium of claim 19, wherein the instructions direct the processor to generate the key pair using a Rivest-Shamir-Adleman (RSA) algorithm.

23. The non-transitory computer-readable medium of claim 19, wherein the instructions direct the processor to generate the key pair using an Elliptic Curve Digital Signature Algorithm (ECDSA).

24. A non-transitory computer-readable medium comprising instructions that direct a processor to extract public key infrastructure information from a system-on-chip (SOC), wherein the instructions, when executed, direct the processor to:
   read a key file stored in a plurality of silicon fuses, the key file comprising a public key and a unique signature extracted from a digital certificate;
   regenerate the digital certificate from the public key using a template that contains deterministic portions of the digital certificate;
   validate the unique signature as part of the digital certificate;
   validate the unique signature using a root certificate; and
   store the digital certificate in non-volatile memory.

25. The non-transitory computer-readable medium of claim 24, wherein the digital certificate is an x.509 certificate.

26. The non-transitory computer-readable medium of claim 24, wherein the public key is a Rivest-Shamir-Adleman (RSA) key.

27. The non-transitory computer-readable medium of claim 24, wherein the public key is an Elliptic Curve Digital Signature Algorithm (ECDSA) key.

* * * * *